Patented Sept. 18, 1928.

1,684,782

UNITED STATES PATENT OFFICE.

HANS RUBINSTEIN, OF VIENNA, AUSTRIA.

PROCESS FOR THE MANUFACTURE OF DOUBLE CARBONATE OF SODIUM AND MAGNESIUM.

No Drawing.  Application filed September 23, 1926. Serial No. 137,391.

The process described in literature for producing double carbonate of sodium and magnesium ($Na_2CO_3MgCO_3$) are, as is also pointed out by Knorre in the journal "Zeitschrift für anorganische Chemie", Tome 34 (1903), page 278, not practicable for the reason, that the reaction between the components takes place irregularly and in general only proceeds to the formation of the trihydrate of magnesium carbonate.

Prior to the present invention I had proposed to produce the double carbonate of sodium and magnesium by treating magnesium carbonate with a solution of soda (sodium bicarbonate), saturated with sodium bicarbonate in the cold, at a temperature of approximately 60° to 70° C. during several hours. The necessary concentration of the sodium bicarbonate can in such case be constantly maintained during the reaction by the addition of solid bicarbonate to the solution of soda or by introducing carbonic acid into the solution under pressure.

Now I have found out the astonishing fact, that it is possible to produce the double carbonate of sodium and magnesium by treating artificial or natural magnesium carbonate in the presence of some alkali metal chloride, preferably of sodium chloride under heat with an excess of soda in the form of a solution. Preferably this solution contains the soda in an amount double of that of the magnesium carbonate and may be employed when saturated in the cold state. Advantageously an addition of 10% of NaCl is made, calculated on the employed amount of soda.

This is a most reliable method for causing the addition of soda to the magnesium carbonate in the stoichiometrical relation 1:1 already after heating the reaction mixture for a few hours. The temperature during this treatment ought preferably to be maintained between 60° and 70° C. The double carbonate of sodium and magnesium thus obtained is suspended in water, then washed and carefully dried in the air. The practical yield will amount to about 85% of the theoretical one.

The product obtained by this process may be utilized as antacidum for therapeutical purposes as well as for impregnating fabrics and other objects.

*Example.*

1 mol of natural or artificial magnesium carbonate is suspended in a solution of 2/10 mol of NaCl and is during several hours maintained at a temperature of 60° to 70° C., while about 2 mols of soda in the form of a solution saturated therewith in the cold state are added successively. The precipitated crystalline product is after suitable purification dried at ordinary temperature.

What I claim is:

1. A process for the manufacture of double carbonate of sodium and magnesium, which consists in treating magnesium carbonate in the presence of an alkali metal chloride under heat with an excess of soda in the form of a solution.

2. A process for the manufacture of double carbonate of sodium and magnesium, which consists in treating magnesium carbonate in the presence of sodium chloride under heat with an excess of soda in the form of a solution.

3. A process for the manufacture of double carbonate of sodium and magnesium, which consists in treating magnesium carbonate in the presence of sodium chloride under heat with an excess of soda in the form of a solution the quantity of soda amounting to the double of that of the magnesium carbonate.

4. A process for the manufacture of double carbonate of sodium and magnesium, which consists in treating magnesium carbonate preliminarily suspended in water in the presence of sodium chloride under heat with an excess of soda in the form of a solution.

5. A process for the manufacture of double carbonate of sodium and magnesium, which consists in treating magnesium carbonate preliminarily suspended in water in the presence of sodium chloride under heat with an excess of soda in the form of a solution, the proportion of sodium chloride amounting to 10% of the quantity of the employed soda.

6. A process for the manufacture of double carbonate of sodium and magnesium, which consists of suspending magnesium carbonate in a watery solution of sodium chloride, successively adding, while heating an excess of soda in the form of a solution saturated therewith in the cold state and then continuing the reaction by heat.

7. A process for the manufacture of double carbonate of sodium and magnesium, which consists of suspending magnesium carbonate in a watery solution of sodium chloride, adding successively to the mixture heated up to 60° to 70° C. an excess of soda in the form of a solution saturated therewith in the cold state and then continuing the reaction by heat during several hours.

8. A process for the manufacture of double carbonate of sodium and magnesium, which consists of suspending magnesium carbonate in a watery solution of sodium chloride, adding successively to the mixture heated up to 60° to 70° C. an excess of soda in the form of a solution saturated therewith in the cold state and then continuing the reaction by heat during several hours the proportion of sodium-chloride amounting to about 10% of the quantity of the employed soda.

9. A process for the manufacture of double carbonate of sodium and magnesium, which consists of suspending magnesium carbonate in a watery solution of sodium chloride, adding successively to the mixture heated up to 60° to 70° C. an excess of soda in the form of a solution saturated therewith in the cold state and then continuing the reaction by heat during several hours, whereafter the precipitated crystalline double carbonate of sodium and magnesium is cleansed by suspension in water, separated from the washing water by filtration and carefully dried in the air.

In testimony whereof I have affixed my signature.

HANS RUBINSTEIN.